Jan. 24, 1956    W. G. CONOVER    2,731,879
OPTICAL TESTING DEVICES OF THE PERIMETER TYPE
Filed May 22, 1951    2 Sheets-Sheet 1

INVENTOR.
WILLIAM G. CONOVER
BY
Jas. C. Hobensmith
ATTORNEY

Jan. 24, 1956 W. G. CONOVER 2,731,879
OPTICAL TESTING DEVICES OF THE PERIMETER TYPE
Filed May 22, 1951
2 Sheets-Sheet 2
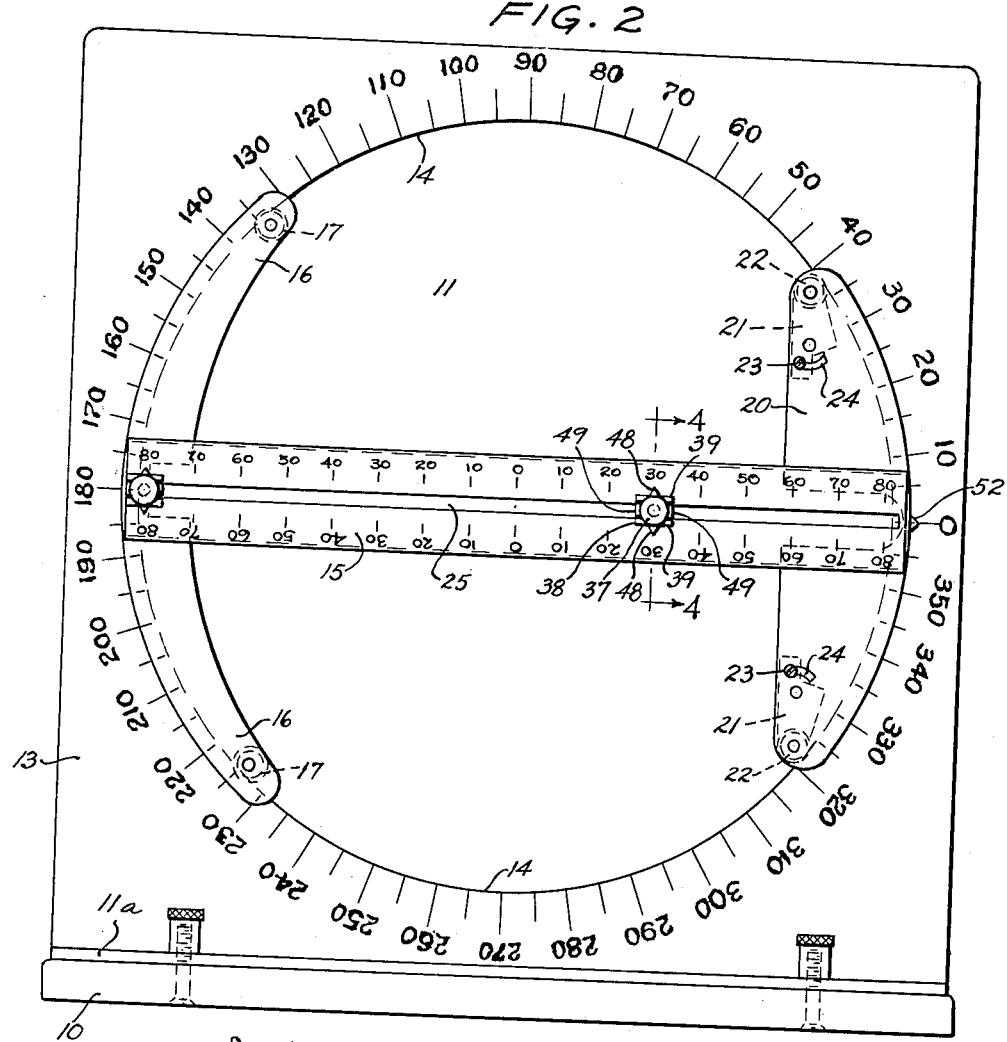
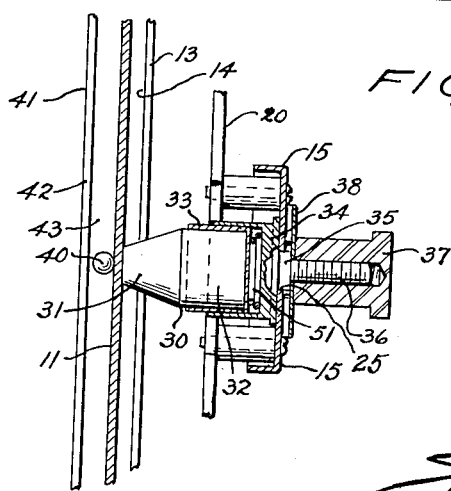
INVENTOR.
WILLIAM G. CONOVER
BY
Jas. C. Hobensmith
ATTORNEY

United States Patent Office 2,731,879
Patented Jan. 24, 1956

2,731,879
OPTICAL TESTING DEVICES OF THE PERIMETER TYPE

William G. Conover, Philadelphia, Pa.

Application May 22, 1951, Serial No. 227,644

5 Claims. (Cl. 88—20)

This invention relates to optical testing devices of the perimeter type and it relates more particularly to apparatus by means of which determination of retinal conditions may be made, particularly for the delineation of the extent and shape of the visual field, which are not only indicative of conditions of the retina, as well as other parts of the eyes, but which sometimes are also indicative of various other physical conditions or ailments of a patient under examination.

Heretofore, when tests were to be made for the purpose of determining the extent and shape of the visual field, and for determining the location of blind spots in the retina, it was customary to utilize a board, usually made of composition material, and having a field about two meters square provided with a small red dot in the center. The patient was seated with his eyes about one meter distant from the surface of the board, a head piece being used to prevent movement of the patient's head. Such a test was commonly known as a tangent field test.

One eye was tested at a time, the operator using a wand about sixteen inches long, having a white head at the end thereof, and standing at the side the operator would cause the bead at the end of the wand to pass radially across the field from the outer edge towards the center thereof. The patient, meanwhile having been directed to concentrate his visual attention upon the red spot in the center of the board, would inform the operator whenever the white bead at the end of the wand would pass into the visual field of the eye of the patient whereupon the operator would mark the spot by means of a thumb tack or similar indicating device.

The operator, after having passed the bead along the various radii on the one half of the board, would then go to the other side of the board and repeat the operation with respect to the radii on that side. The operation was performed first with one eye and then with the other, and the record thus obtained was transferred to a chart. The chart most frequently used is known as Bjerrum or Berens chart.

However, in the use of such device, there was a natural tendency of the patient to anticipate the movement of the bead under the control of the operator, and the patient would often shift his eye from the center spot on the field, with the result that the records obtained frequently were not entirely accurate.

The principal object of the present invention is to provide a simple and efficient device by means of which more accurate records may be obtained of the visual field of a patient whose eyes are being tested.

A further object of the invention is to provide a device of the character aforesaid, in the use of which the patient is prevented from anticipating the approach of the testing element and thus reducing the tendency of the patient to shift his field of vision.

A further object of the invention is to provide a device of the character aforesaid with improved means for indicating the extent and outline of the visual field of the patient's eyes, as well as other retinal conditions.

A further object of the invention is to provide a device of the character aforesaid in which the movements of the operator will be less distracting to the patient.

A further object of the invention is to provide a device of the character aforesaid, which will enable the operator to stand behind the same, at the center thereof, directly in front of and facing the patient, whereby the operator may constantly observe the patient's eyes while under test, and know whenever the patient's attention wanders from the focal point provided at the center of the field of the apparatus, so that the operator may make sure that the patient at all times adheres to this important requirement.

A further object of the invention is to provide a device of the character aforesaid, in which the visual beads used may be of various sizes, and which may be readily changed by the operator from one size to another whenever certain conditions require it in the use of the apparatus.

The nature and characteristic features of the invention will be more readily understood from the following description, taken in connection with the accompanying drawings forming part hereof, in which:

Fig. 2 is a rear elevation thereof;

Fig. 4 is a fragmentary sectional detail view, enlarged, taken approximately on the line 4—4 of Fig. 2.

Figure 1:
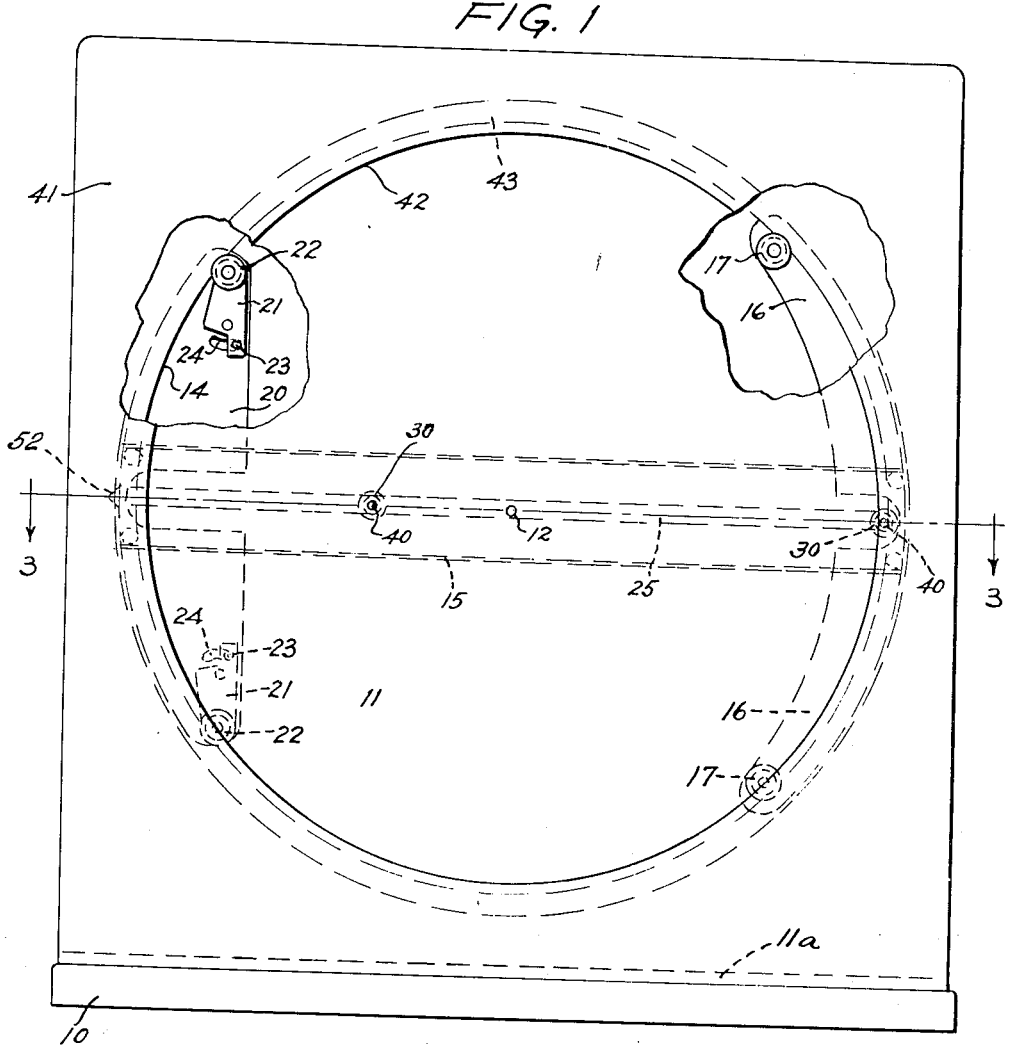
Figure 1 is a front elevation, certain portions thereof being broken away, of the apparatus embodying the main features of the present invention.
Figure 3:
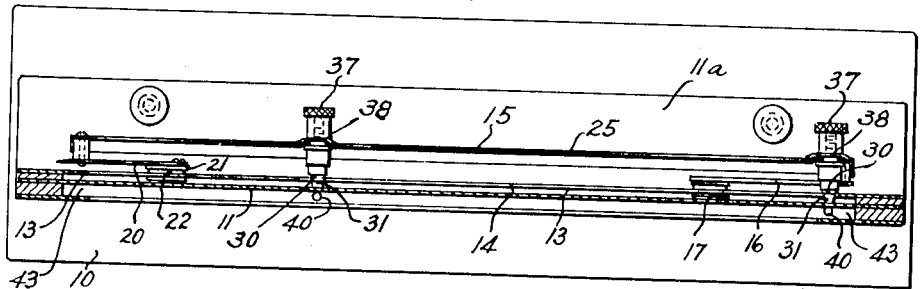
Fig. 3 is a horizontal section taken approximately on the line 3—3 of Fig. 1.

It should, of course, be understood that the description and drawings herein are illustrative merely, and that various modifications and changes may be made in the structure disclosed without departing from the spirit of the invention.

Referring to the drawings, in the particular embodiment of the invention therein shown 10 is a base member upon which a vertical plate 11 is mounted by means of an angle bracket member 11ª.

The plate 11 is made of a sheet of non-magnetic material, such as aluminum or brass, and has its front face, at least, preferably of a dark gray color, thereby to provide a visual field. No attempt has been made to indicate any particular color in the drawing, as to do so would only result in confusion.

At the center of the front face of the plate 11 there is a small spot 12, preferably red in color, upon which spot 12 the patient is directed to concentrate the vision of the one eye under test during the use of the apparatus.

To the rear of the plate 11 there is mounted another plate 13, spaced from the plate 11, and having a large central circular opening. The inner edge 14 of the central opening of the plate 13 serves as a trackway for a purpose to be presently explained.

Extending diametrically across, and located to the rear of the plate member 13 is a bridge member 15 mounted to rotate about an axis passing through the center of the plate 11. The bridge member 15 is provided at one end with a bracket member 16, having portions extending on each side of the bridge member 15, and provided near the outer ends thereof with grooved rollers 17 which engage the trackway provided by the inner edge 14 of the circular opening in the plate 13 which is located to the rear of the visual plate 11.

At the other end of the bridge member 15 there is provided a bracket 20 somewhat similar to bracket 16 having, near each outer end thereof, a pivoted auxiliary bracket 21 which carries, at one end thereof, a grooved roller 22, and at the other end, a screw 23 which extends through a slot 24 in the bracket member 20.

The foregoing arrangement is provided for the purpose of facilitating the mounting of the bridge member 15 so as to permit said bridge member to be rotated about an axis coinciding with the center of the visual plate 12.

The bridge member 15 is provided with a slot 25, extending from end to end, and provided for the purpose of movably mounting one, or preferably two, magnetic devices of the type shown in detached detail in Fig. 4 of the drawings. When two of said magnetic devices are used they will be initially located one at each end of the bridge member 15. Each of said magnetic devices preferably comprises a permanent magnet 30 having one polar end 31 thereof, of frusto-conical form, and the other end 32 thereof, of cylindrical form.

The rear or cylindrical end portion 32 of the magnet 30 is seated in a cup member 33, which in turn is movably mounted in a circular recess in a supporting device 34. The supporting device 34 is slidably mounted on the inner face of the bridge member 15.

The front end of the magnet 30 bears against the rear face of the visual plate member 11, being impelled to such bearing position by means of a conical coil spring 51 located in the recess in the supporting device 34.

The magnet supporting device 34 has a shank, a portion 35 of which is complemental in shape to the slot 25 in the bridge member 15, and the end portion 36 of which is threaded for the mounting thereon of a manually operable clamping nut 37.

A plate member 38 is mounted between the portion 35 of the shank of the magnet supporting member 34 and the inner face of the nut 37. Said plate member 38 has spring arms 39 which bear against the rear face of the bridge member 15 and has other arms 49 which extend into the slot 25 for the purpose of preventing the rotation of said plate member with respect to the bridge member 15.

The plate member 38 is also provided on each side with V-shaped points 48 which are adapted to serve as indicators in connection with a scale engraved upon the rear face of the bridge member to indicate to the operator the distance, according to a predetermined standard, of the magnet supporting device 34 from the center of the plate 11, with which the axis of rotation of the bridge member 15 coincides.

The plate member 13, the inner edge 14 of the central opening of which serves as a trackway for guiding the rotation of the bridge member 15 about the central axis, is also provided adjacent said edge 14 with a circular scale, to indicate to the operator the particular diametral position of the bridge member whenever a reading is taken. A portion of the structure for supporting the bridge member 15, for example, the bracket 20, may be provided with a pointer 52 to facilitate the reading of the scale provided for indicating the diametral position of the bridge member.

The bead which is utilized, in connection with each of the magnetic devices, for determining the outline of the visual field of the patient, comprises a ball 40 made of magnetic material, such as steel, said ball being preferably painted white, so as to be readily perceptible to the patient during the test.

In front of the visual plate 11 there is mounted another plate 41 also having a large central opening 42 of an area ordinarily smaller than that of the circular opening in plate 13.

The plate member 41 having the circular opening 42 is spaced from the visual plate 11, and thus provides a channel 43 within which the balls 40 may be initially positioned before each successive step in a particular test, and within which channel the balls may be moved circumferentially to any desired radial starting point whereby the patient will be deprived of any advance notice of the location of the bead as the same is moved inwardly along the various radial lines during the test.

The mode of operation of the device should now be readily understood. The ball 40, being of magnetic material, when placed in front of plate member 11 at a location in alinement with the axis of the magnet 30 by which it is controlled, may be readily moved from place to place on the front face of said plate 11, without any previous indication to the patient as to where to look for the same. The patient will thereby be better able to focus his attention upon the spot 12 in the center of the plate 11.

The prevention of such anticipation by the patient will be greatly enhanced by the provision of the channel 43 within which the ball 40 may be brought and hidden from view between testing movements thereof by the operator, and within which it may be shifted to different initial radial locations without knowledge thereof by the patient.

The operator standing behind the apparatus will have his movements shielded by the same and he will thus be enabled to shift the bridge member to various angular locations, and also to shift the magnetic device upon the bridge member without the operator's movements being perceptible to the patient.

While the test is being conducted, the operator may call off, or may set down on a suitable chart, the various angular positions and radial distances as measured by the indicia on the bridge member and on the rear face of the plate member, whenever the ball passes into the visual field of the patient in the several steps of the test.

It will be seen that there is thus provided a simple and efficient device for the purpose indicated which will not only facilitate the test operations, but will also cause the record thereby obtained to be much more accurate than the methods heretofore used, by reason of the patient being better able to concentrate his visual attention upon the central spot, and also by reason of his inability to anticipate from what location and in which direction the ball will enter the visual field in each successive step of the test.

The plate member 11 is preferably about 24 inches square and is placed on a table or stand of suitable height, so that the operator is enabled to stand in the rear thereof, at the center of same, directly facing the patient. The operator having placed the bridge member in position for the movement of the ball along the desired radius, is enabled to move the magnet toward the center, free from any particular attention on the part of the operator, to manually follow the radial line. The operator is thus able to concentrate on watching the patient's eye, to see that it does not deviate from the required fixed gaze toward the central dot on the field provided by the plate 11.

This eliminates an existing handicap caused by the operator being compelled to stand so far to the side when using a two meter screen, which makes it difficult to determine whether the patient is following instructions to keep his eye fixed on the center dot.

The position or distance of the patient's eye in relation to a screen of any size, would be in direct proportion to the relation established as applying to the usual field of two meters square, where the patient's eye is positioned one meter from the central dot on the field. Applying this rule the distance indicated for the standard size of this device is based upon the effective range of the bead as being the maximum observable travel.

For example, on the preferred size of plate twenty-four inches square, the maximum travel of the bead is twenty-one and one-half inches, and therefore the distance of the patient's eye should be one-half of the same, or ten and three-quarter inches. Under certain conditions of the individual patient this may be varied by the operator.

In the use of the present device, the position of the bead on the field is indicated by the scale provided on the bridge member, by definitely measuring the point at which the bead, in its travel along a particular diametral line, was stopped in accordance with the patient's announcement when the bead is first observed.

The calibrated scale on the bridge member coincides with the scale of the particular chart being used, such as the well known Bjerrum chart, and the indicated position of the bead is then marked upon the chart, for the particular radius in which it is caused to move.

The record so obtained will be exact because the magnet holds the bead on the field at the precise spot shown by the scale on the bridge member. Thus the device eliminates a possible source of error, such as often occurs when the operator, in removing the wand to affix the marker on the board, fails to place it in the correct location. Thus the device eliminates another possible cause of error.

It should of course be understood that the device may be made in any desired area, including the two meters square field heretofore commonly used, but where the size is so large that the operator, standing back of the screen, can not see over the top to watch the patient's eye, an opening (not shown) of suitable size may be provided in the screen, through which opening the operator would observe the patient's eye. Such an opening could be located at a suitable height and preferably at one side of the 90° radius, but relatively close to the center.

Inasmuch as the bead will always be drawn back to the periphery at the completion of each of the radii tested and the bridge then adjusted for another radius, it is obvious that such an opening will not interfere with the movements of the magnet or the passage of the bead.

I claim:

1. An optical testing device of the perimeter type comprising a vertically disposed opaque plate member the front face of which provides a visual field, said plate member being made of non-magnetic material, a mark on the front face of said visual plate member for indicating the visual center thereof, a bridge member mounted to the rear of and extending diametrically across said plate member, means for supporting said bridge member whereby it may be rotated to selective diametral positions about an axis passing through the visual center of the plate member, said means comprising a plate member spaced from the rear face of the visual field plate member and having a central opening providing a circular track, and rollers supported from the bridge member engaging said track, a support carried by the bridge member and shiftable thereon along a straight diametral line passing through the axis of rotation of the bridge member, a magnet carried by said support, and a target ball of magnetic material supported on the front face of the plate member solely by said magnet and movable thereon by the shifting of the support and the magnet carried thereby, the movement of the bridge member and the magnet being concealed from the front by the visual plate member.

2. An optical testing device of the perimeter type comprising a vertically disposed opaque plate member the front face of which provides a visual field, said plate member being made of non-magnetic material, a mark on the front face of said visual plate member for indicating the visual center thereof, a bridge member mounted to the rear of and extending diametrically across said plate member, means for supporting said bridge member whereby it may be rotated to selective diametral positions about an axis passing through the visual center of the plate member, said means comprising a plate member spaced from the rear face of the visual field plate member and having a central opening providing a circular track, and rollers supported from the bridge member engaging said track, a support carried by the bridge member and shiftable thereon along a straight diametral line passing through the axis of rotation of the bridge member, a magnet carried by said support, a target ball of magnetic material supported on the front face of the visual field plate member solely by said magnet and movable thereon by the shifting of the magnet, the movement of the bridge member and the magnet being concealed from the front by the visual field plate member, and a plate member spaced from the front face of the visual plate member having a central opening larger than the working area of the visual field providing a channel extending around the outside of the working area of the visual field into which channel the ball may be retracted from view and in which it may be shifted to a new diametral position while concealed therein.

3. An optical testing device of the perimeter type comprising a vertically disposed opaque plate member the front face of which provides a visual field, said plate member being made of non-magnetic material, a mark on the front face of said visual plate member for indicating the visual center thereof, a bridge member mounted to the rear of and extending diametrically across said plate member, means for supporting said bridge member whereby it may be rotated to selective diametral positions about an axis passing through the visual center of the plate member, said means comprising a plate member spaced from the rear face of the visual plate member and having a central opening providing a circular track, and rollers supported from the bridge member engaging said track, a support carried by the bridge member and shiftable thereon along a straight diametral line passing through the axis of rotation of the bridge member, a magnet carried by said support, a target ball of magnetic material supported on the front face of the visual field plate member solely by said magnet and movable thereon by the shifting of the magnet, and indicia visible only from the rear for indicating the diametral position of the bridge member and the longitudinal position of the magnet on said bridge member, the movement of the bridge member and the magnet being concealed from the front by the opaque visual field plate member, and a plate member spaced from the front face of the visual plate member having a central opening larger than the working area of the visual field providing a channel extending around the outside of the working area of the visual field into which channel the ball may be retracted from view and in which it may be shifted to a new diametral position while concealed therein.

4. An optical testing device of the perimeter type comprising a vertically disposed opaque plate member the front face of which provides a visual field, said plate member being made of non-magnetic material, a mark on the front face of said visual plate member for indicating the visual center thereof, a bridge member mounted to the rear of and extending diametrically across said plate member, means for supporting said bridge member whereby it may be rotated to selective diametrical positions about an axis passing through the visual center of the visual field plate member, said means comprising a plate member spaced from the rear face of the visual field plate member and having a central opening providing a circular track, and rollers supported from the bridge member engaging said track, a support carried by the bridge member and shiftable thereon along a straight diametral line passing through the axis of rotation of the bridge member, a magnet carried by said support, a target ball of magnetic material, supported on the front face of the plate member solely by said magnet and movable thereon by the shifting of the magnet, indicia on the rear of the track member for indicating the diametral position of the bridge member, and indicia on the bridge member for indicating the longitudinal position of the magnet on said bridge member, the movement of the bridge member and the magnet being concealed from the front by the opaque visual field plate member, and a member spaced from the front face of the visual plate member having a central opening larger than the working area of the visual field providing a channel extending around the outside of the working area of the visual field into which channel the ball may be retracted from view and in which it may be shifted to a new diametral position while concealed therein.

5. An optical testing device of the perimeter type comprising a vertically disposed opaque plate member the front face of which provides a visual field, said plate member being made of non-magnetic material, a mark on the front face of said visual plate member for indicating the visual center thereof, a magnet shiftably supported to the rear of said plate member, a target ball of magnetic material supported on the front face of the plate member solely by said magnet and movable thereon by the shifting of the magnet, the movement of the magnet being concealed from the front by the opaque visual plate member, a plate member spaced from the front face of the visual plate member having a central opening larger than the working area of the visual field and another plate member having a central opening larger than that in the last mentioned plate member and interposed between said last mentioned plate member and the visual field plate member thereby providing a circular channel extending around the outside of the working area of the visual field into which the ball may be retracted from view and in which it may be shifted while concealed therein to a new location for re-entrance onto the visual field.

References Cited in the file of this patent

UNITED STATES PATENTS

| | | |
|---|---|---|
| 1,771,908 | Armstrong | July 29, 1930 |
| 2,067,103 | Simpkins | Jan. 5, 1937 |

FOREIGN PATENTS

| | | |
|---|---|---|
| 113,641 | Great Britain | Feb. 25, 1918 |
| 264,664 | Switzerland | Feb. 1, 1950 |